United States Patent
Jaspers

(10) Patent No.: US 7,081,919 B2
(45) Date of Patent: Jul. 25, 2006

(54) GREEN RECONSTRUCTION FOR IMAGE SENSORS

(75) Inventor: Cornelis Antonie Maria Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 721 days.

(21) Appl. No.: 10/067,414

(22) Filed: Feb. 4, 2002

(65) Prior Publication Data

US 2002/0149687 A1    Oct. 17, 2002

(30) Foreign Application Priority Data

Feb. 6, 2001    (EP)    ................... 01200422

(51) Int. Cl.
H04N 9/73    (2006.01)
H04N 3/14    (2006.01)
H04N 5/335    (2006.01)

(52) U.S. Cl. .................. 348/223.1; 348/272; 348/275

(58) Field of Classification Search ........ 348/272–280, 348/268, 242, 222.1, 223.1, 225.1, 228.1, 348/675; 382/162–167, 312; 358/518, 525
See application file for complete search history.

(56) References Cited

U.S. PATENT DOCUMENTS

| | | | | |
|---|---|---|---|---|
| 4,630,307 A * | 12/1986 | Cok | .............. | 382/165 |
| 5,065,229 A * | 11/1991 | Tsai et al. | .............. | 348/391.1 |
| 5,119,180 A | 6/1992 | Okamoto | .............. | 358/41 |
| 5,333,055 A | 7/1994 | Murata et al. | .............. | 348/239 |
| 5,382,976 A * | 1/1995 | Hibbard | .............. | 348/273 |
| 5,475,769 A * | 12/1995 | Wober et al. | .............. | 382/167 |
| 5,528,292 A * | 6/1996 | Ikeda | .............. | 348/222.1 |
| 5,631,703 A * | 5/1997 | Hamilton et al. | .............. | 348/273 |
| 5,652,621 A * | 7/1997 | Adams et al. | .............. | 348/272 |
| 5,805,216 A * | 9/1998 | Tabei et al. | .............. | 348/246 |
| 5,805,217 A * | 9/1998 | Lu et al. | .............. | 348/273 |
| 5,990,950 A * | 11/1999 | Addison | .............. | 348/273 |
| 6,229,578 B1 * | 5/2001 | Acharya et al. | .............. | 348/607 |
| 6,263,102 B1 * | 7/2001 | Jaspers | .............. | 382/162 |
| 6,269,181 B1 * | 7/2001 | Acharya | .............. | 382/162 |
| 6,549,233 B1 * | 4/2003 | Martin | .............. | 348/273 |
| 6,563,537 B1 * | 5/2003 | Kawamura et al. | .............. | 348/252 |
| 6,628,327 B1 * | 9/2003 | Aoki et al. | .............. | 348/221.1 |
| 6,697,110 B1 * | 2/2004 | Jaspers et al. | .............. | 348/272 |
| 6,727,945 B1 * | 4/2004 | Jaspers | .............. | 348/272 |

FOREIGN PATENT DOCUMENTS

WO    9748075 A1    12/1997
WO    9904555 A2    1/1999

OTHER PUBLICATIONS

"A New Perceptual Approach for CCD Matrix Calculation", by Young Ho Kim et al., XP 000952121, pp. 586-597.
"Vector Color Filter Array Demosaicing", by Maya R. Gupta et al., XP008001906, pp. 374-382.

* cited by examiner

Primary Examiner—Tuan Ho
Assistant Examiner—Kelly Jerabek

(57) ABSTRACT

The present invention relates to interpolating a missing color value of a given pixel in an array of pixels. The missing color value is determined from color values of neighboring pixels using a median-based technique in which the median is taken of the four pixels values of the horizontally and vertically neighboring pixels (G1–G4) having a same color as the missing color value, and color information from at least one other color (R/B) at the given pixel.

6 Claims, 3 Drawing Sheets

M(0.5, 0, 1) = 0,5     M(0.5, 1, 0) = 0,5     M(0.5, 0, 1) = 0,5     M(0.5, 1, 0) = 0,5

GREEN RECONSTRUCTION FOR IMAGE SENSORS

The present invention relates to interpolating missing color values of a pixel in an array of pixels.

In digital cameras a lens is used to obtain light information from a scene. These light photons are converted into electrons by an image sensor consisting of a number of light sensitive elements. When using digital RGB still cameras, three image sensors are used to obtain color sensing for each color red, green and blue. In order to reduce both cost and size of the camera, it is possible to use one image sensor having an RGB Bayer filter array in which each pixel in the sensor array senses red, green or blue in a predefined pattern. This pattern is build up of alternating green, red columns and green, blue columns. When using one image sensor to sense all three colors, it is necessary to reconstruct the missing pixels before the total image is represented.

In WO 99/04555 a green reconstruction method for RGB Bayer image sensors has been described. The reconstruction concerns only the green color reconstruction, the red and blue colors remain reconstructed in a conventional way. The reconstruction of the missing green pixel is carried out by means of a median filter that sorts three specific variables: two of them are derived from the green color, the third one from the red or blue color. A disadvantage of this method is that for high saturated colored edges artefacts which look like the border of a postage stamp are introduced.

First a short description of the green reconstruction method of WO 99/04555 will be given. This method will be referred to as smartgreen1 reconstruction. The algorithm for smartgreen1 is based on the fact that resolution losses are best observed in high frequency near white scene parts and less near colored parts.

With this in mind, the contribution of the red and blue pixel is used to help determine the reconstruction value of the missing green pixels. The objective of smartgreen1 reconstruction is to maximize the resolution of the green color. For this purpose a median filter algorithm is applied. In FIG. 1 the chosen definition of the green pixels surrounding the missing green pixel, i.e. the location which is occupied by a red or blue (R/B) pixel, is shown. This is used to declare the following variables:

$G12=(G1+G2)/2$ $G34=(G3+G4)/2$

Further the variable RBc is defined as the near white adapted red or blue color value of the center pixel, defined later, and SmartGcntrlR and SmartGcntrlB are near white matrix and white balance correction parameters. The calculation of these parameters is described below.

In smartgreen1 reconstruction for especially digital signal, processing is performed by sorting the data of G12, G34 and RBc in order of magnitude. The center value of the sorted sequence, also called the median value, will be applied for the reconstruction of the missing green pixel.

$smartG=median(G12, G34, RBc)$

For a red and blue center pixel, respectively, the RBc value becomes:

$RBc=SmartGcntrlR*R$ $RBc=SmartGcntrlB*B$

The median filter for green replaces the conventional green reconstruction. The conventional red and blue reconstruction method is, however, maintained.

In FIG. 2 an example of a vertical green-magenta scene color transient is shown. In total four different modes are illustrated: A trailing green edge and a leading green edge and the phase relations to the missing green pixel in the center.

The green color is illustrated at the top of the Fig.; above the pixel definitions and below the definitions the magenta transients are shown. Finally, the corresponding projection of green on the imaginary sensor pixels is shown when interpolating using the smartgreen1 method.

According to the smartgreen1 median algorithm, being $smartG=median(G12, G34, RBc)$, the result of the reconstructed center green becomes 0.5 for all four modes.

For the shown vertical colored edges smartgreen1 causes a green intensity modulation in the vertical direction resembling the border of a postage stamp. It should be noted that the same applies to colored edges in the horizontal direction. FIG. 3 shows the RGB reconstruction result with smartgreen1 of a green-magenta scene transient. Green to the left and magenta to the right.

It is an object of the present invention to provide a method for green color reconstruction preventing the above artefacts. To this end, the invention provides a green reconstruction for image sensors as defined in the independent claims. Advantageous embodiments are defined in the dependent claims.

According to a preferred embodiment of the present invention, the green modulation problem can be prevented using a median filter that sorts the four individual neighboring green pixels and the center RBc value. The following applies to this 5-pixel median filter: $smartG=median(G1, G2, G3, G4, RBc)$.

In a preferred embodiment of the present invention, it is determined whether a selected pixel forms part of an edge in the image and whether said edge has an angle to the vertical line substantially different from 90 degrees. If so, the prior art smartgreen1 algorithm is used, while the inventive 5-input median is used for substantially vertical edges. The edge detection preferably involves the steps of:

a) forming a first pair of diagonal pixels by selecting a vertical and a horizontal neighboring pixel and determining the difference between the color values of these pixels,
b) forming a second pair of diagonal pixels by selecting a vertical and a horizontal neighboring pixel and determining the difference between the color values of these pixels, and
c) determining the difference between color values of the pixels of the first and second pair of pixels.

Step c) may further comprise a step of determining if the determined differences are below the predefined level. This predefined level may be between 3 and 10 percent of maximum color value, such as between 4 and 8 percent of maximum color, such as between 5 and 7 percent of maximum color value.

These and other aspects of the invention will be apparent from and elucidated with reference to the embodiments described hereinafter.

Figure 1:
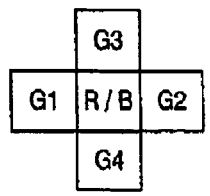
FIG. 1 shows the definition of the green pixels surrounding the missing green pixel.
Figure 2:
FIG. 2 shows a vertical green-magenta scene color transient.
Figure 2:
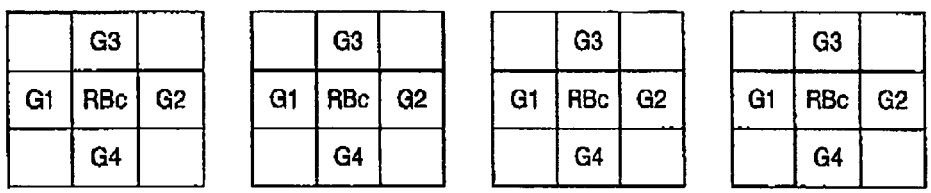
Figure 2:
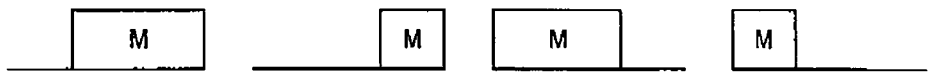
Figure 2:
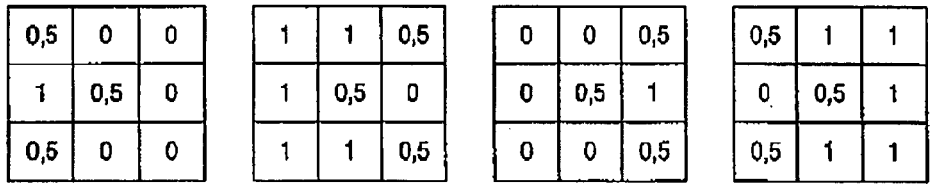
Figure 3:
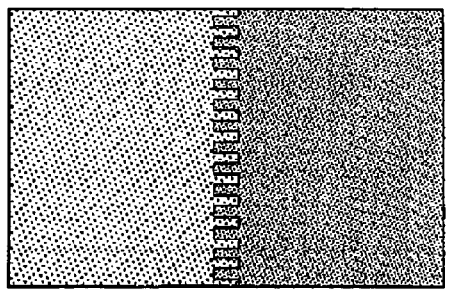
FIG. 3 shows the RGB reconstruction result with smartgreen1 of a green-magenta scene transient.
Figure 4:
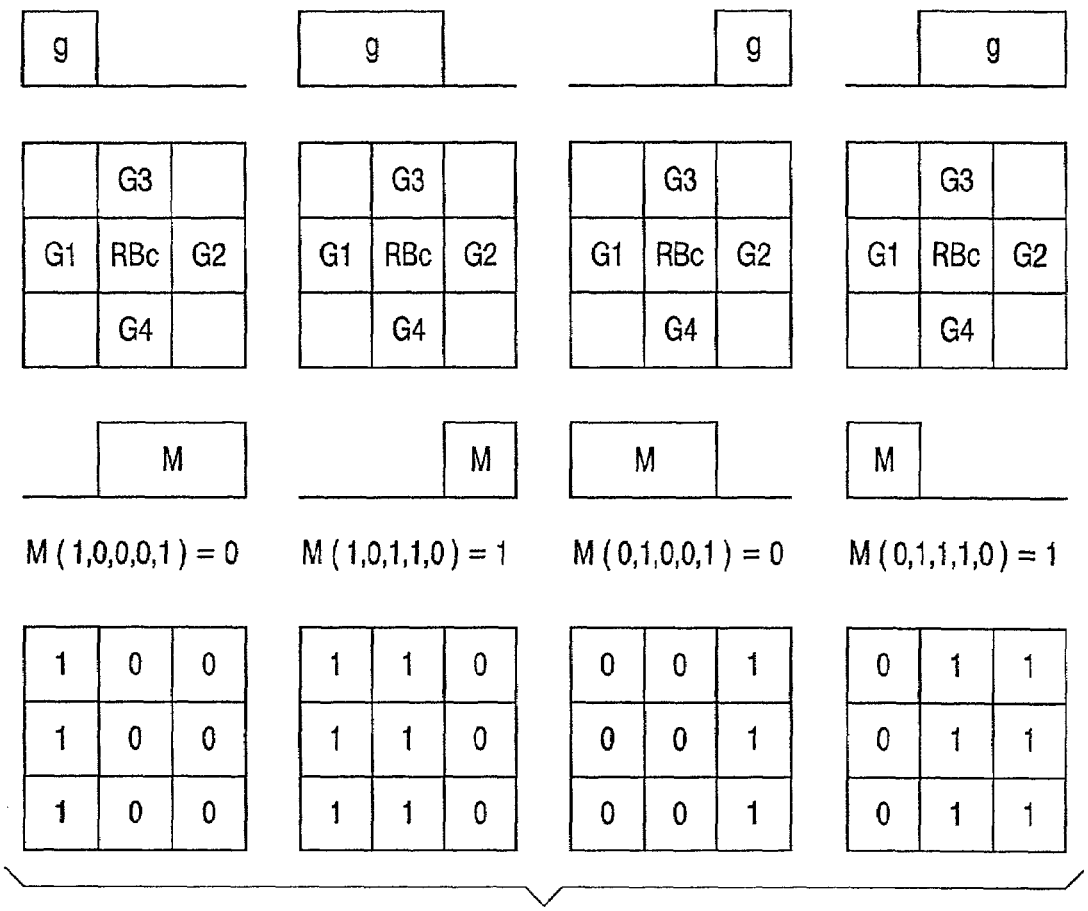
FIG. 4 shows the colored edge reproduction by the 5-pixel median filter.
Figure 5:
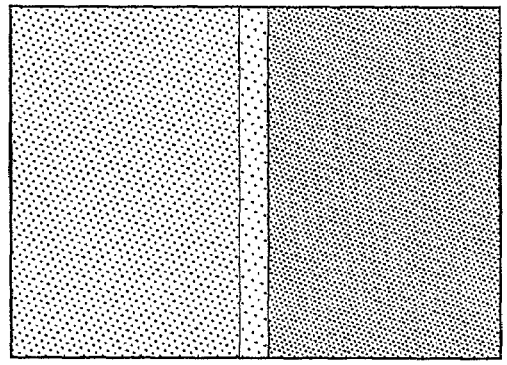
FIG. 5 shows the reconstructed RGB transient with the 5-pixel median filter.

With a green-magenta colored scene transient, the green reconstruction result of this filter becomes as shown in FIG. 4. The green color is illustrated at the top of the Fig. and between the imaginary pixel illustrations the magenta transients are shown above the corresponding projection of green on the imaginary sensor pixels. The undesired modulation at the colored edges has vanished. In FIG. 5 the RGB reconstruction result of the 5-pixel median filter is shown. Green is shown on the left side of the Fig. and magenta is shown on the right side.

Unfortunately, the 5-pixel median filter causes some extra distortion in a zone plate scene, especially in the diagonal direction just outside the green Nyquist domain. It also suffers from distorted border artefact if the colored edges are rotated 45 degrees. A direction dependent condition can help to reduce or eliminate the diagonal amount of distortion.

Figure 6:
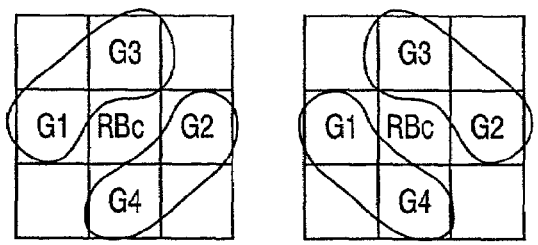
FIG. 6 shows the diagonal direction detection.

A diagonal direction detection can be performed using the following algorithm:

If a first set of two diagonal pixels has approximately the same first green value and a second set of diagonal pixel has approximately the same second green value being different from said first green value, there is a large chance that it is a diagonal edge, see FIG. 6. Written in a software form this becomes:

if ((abs(G1−G3)<SG1level) and (abs(G4−G2)<SG1level))
xor
((abs(G3−G2)<SG1level) and (abs(G1−G4)<SG1level))
then select smartgreen1
else select 5-pixel median filter.

A certain percentage (5–7 percent) of the full-scale amplitude applies to the SGlevel. In practice it is about 6.25% (being a value of 16 on a 256 full-scale range).

Referring to the previous declaration of variables as applied for smartgreen1, the following applies to the new green reconstruction method according to this invention:

if ((abs(G1−G3)<SG1level) and (abs(G4−G2)<SG1 level))
or
((abs(G3−G2)<SG1level) and (abs(G1−G4)<SG1level))
then
smartG=median(G12, G34, RBc)
else smartG=median(G1, G2, G3, G4, RBc)

To the RBc value applies that:

$RBc = SmartGcntr1R * R$ $RBc = SmartGcntr1B * B$

This new method has been tested on colored edges and has been compared with the conventional reconstruction. Clearly, the method of the present invention offers the best results.

In the following the above mentioned parameters SmartGcntr1R and SmartGcntr1B will be explained.

Figure 7:
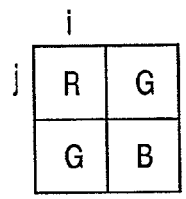
FIG. 7 shows an RGB Bayer luminance pixel.

For a near white luminance signal in the reconstruction block, derived from the RGB pixels of the image sensor, the matrix and white balance parameters have to be taken into account. Since the matrix and white balance are located after the reconstruction, some adaptation of the incoming red and blue colors is necessary. For that purpose the parameters SmartGcntr1R and SmartGcntr1B are used to control the red and blue amplitudes in order that they match with green and result in a near white luminance signal Yn. Referring to FIG. 7, the following applies to this Yn-signal in case of red and blue pixels:

$Yn[i,j] = SmartGcntr1R * red$ $Yn[i+1,j+1] = SmartGcntr1R * blue$

In case of green pixels Yn is equal to green:

$Yn[i+1,j] = green$ $Yn[i,j+1] = green$

Figure 8:
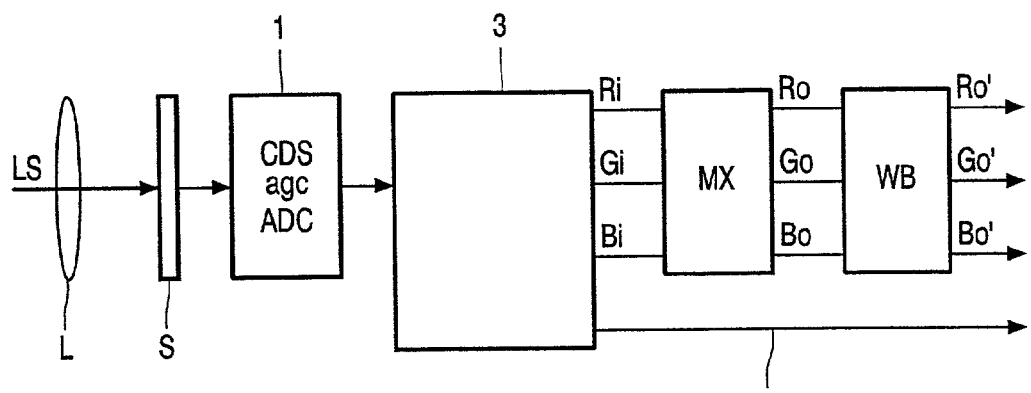
FIG. 8 shows the RGB and contour reconstruction, matrix and white balance of an RGB Bayer color camera.

In FIG. 8 a simplified block diagram is shown with the RGB and aliasing free contour reconstruction, followed by the matrix and the white balance. This block diagram is used to define the parameters in the next formulas for the calculation of SmartGcntrlr/B. Light LS from a scene is passed to an RGB Bayer sensor S thru a lens L. An output signal from the sensor S is applied to a CDS (correlated double sampling, agc (automatic gain control) and ADC (analog to digital conversion) processing block 1. An output of the processing block 1 is applied to an RGB reconstruction and parallel contour processing block 3. The processing block 3 outputs reconstructed RGB signals Ri, Gi and Bi, as well as an aliasing-free contour signal AFC. The reconstructed RGB signals Ri, Gi and Bi are applied to a matrix circuit MX that produces signals Ro, Go and Bo, which are applied to a white balance circuit WB to furnish output signals Ro', Go' and Bo'.

A correction of each RGB Bayer color sensor's primary colors into the EBU primaries, which are accustomed in worldwide television sets and PC monitors, is necessary. The correction is realized with a matrix that requires nine multipliers.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \times \begin{bmatrix} Ri \\ Gi \\ Bi \end{bmatrix}$$

Ro, Go, Bo are the output RGB signals of the matrix and Ri, Gi, Bi are the input signals.

With the white balance after the matrix, the RGB signals become:

$Ro' = awbR \cdot Ro$ $Go' = Go$ $Bo' = awbB \cdot Bo$ where awbR and awbB are the white balance parameters. (According to the World Gray Assumption method (WGA), awbR=totalGreen/totalRed and awbB=totalGreen/totalBlue, where totalRed, totalGreen and totalBlue represent the total of the RGB color amplitudes measured over the whole scene.) Both actions, the matrix together with the white balance, offer the desired white reproduction. The Ro', Go', Bo' signals now guarantee an EBU color reproduction.

For a proper near white luminance signal Yn the opposite has to be done. Therefore, imagine a scene with colors according to the EBU color space and a color temperature equal to D65 white. With the inverse matrix of the one shown below, the color space of the sensor is achieved:

$$\begin{bmatrix} Rii \\ Gii \\ Bii \end{bmatrix} = \begin{bmatrix} b11 & b12 & b13 \\ b21 & b22 & b23 \\ b31 & b32 & b33 \end{bmatrix} \times \begin{bmatrix} Ri \\ Gi \\ Bi \end{bmatrix}$$

where Rii, Gii, Bii represent the colors of an EBU scene and Ri, Gi, Bi the colors of the sensor.

For the luminance signal Yn only the white reproduction of the inverse matrix is of interest, being represented by the sum of the matrix coefficients of each color.

$\Sigma Rii = b11 + b12 + b13$ $\Sigma Gii = b21 + b22 + b23$ $\Sigma Bii = b31 + b32 + b33$ In addition, the color temperature of the scene need not be D65 white. Inclusive an arbitrary color temperature the sum of the matrix coefficients becomes:

$\Sigma Riwb = Rpresetgain \cdot b11 + Gpresetgain \cdot b12 + Bpresetgain \cdot b13$ $\Sigma Giwb = Rpresetgain \cdot b21 + Gpresetgain \cdot b22 + Bpresetgain \cdot b23$ $\Sigma Biwb = Rpresetgain \cdot b31 + Gpresetgain \cdot b32 + Bpresetgain \cdot b33$ where Xpresetgain (X=R, G or B) represents the gain factors for transferring D65 white into that arbitrary color temperature. (For D65 white all Xpresetgain parameters are one.) To the SmartGcntrlR/B parameters used in Yn[i,j] and Yn[i+1,j+1] (see formula below) applies that:

$$SmartGcntrlR = \frac{\Sigma Giwb}{\Sigma Riwb}$$

$$SmartGcntrlB = \frac{\Sigma Giwb}{\Sigma Biwb}$$

The parameter $\Sigma Giwb$ is used as nominator because the green amplitude is regarded as a reference. This applies to the white balance as well.

Now the above formulas can be written in such a way that the measured white balance parameters awbR/B may be applied. Knowing that $$\frac{Gpresetgain}{Rpresetgain} = awbR = \frac{Gtotal}{Rtotal}$$

$$\frac{Gpresetgain}{Bpresetgain} = awbB = \frac{Gtotal}{Btotal}$$

therefore $$\Sigma Riwb = Gpresetgain \cdot \left( \frac{b11}{awbR} + b21 + \frac{b13}{awbB} \right)$$

$$\Sigma Giwb = Gpresetgain \cdot \left( \frac{b21}{awbR} + b22 + \frac{b23}{awbB} \right)$$

$$\Sigma Biwb = Gpresetgain \cdot \left( \frac{b31}{awbR} + b23 + \frac{b33}{awbB} \right)$$

Since the $\Sigma Xiwb$-values are divided in the above, the parameter Gpresetgain is not important because Gpresetgain/Gpresetgain=1. Therefore, the next formula is sufficient for calculating the desired $\Sigma Xiwb$-values:

$$\Sigma Riwb = \left( \frac{b11}{awbR} + b21 + \frac{b13}{awbB} \right)$$

$$\Sigma Giwb = \left( \frac{b21}{awbR} + b22 + \frac{b23}{awbB} \right)$$

$$\Sigma Biwb = \left( \frac{b31}{awbR} + b23 + \frac{b33}{awbB} \right)$$

Now a luminance signal Yn has become available with equal RGB signal amplitudes for white scene colors due to the fact that the sensor matrix and the color temperature of the scene have been taken into account.

Figure 9:
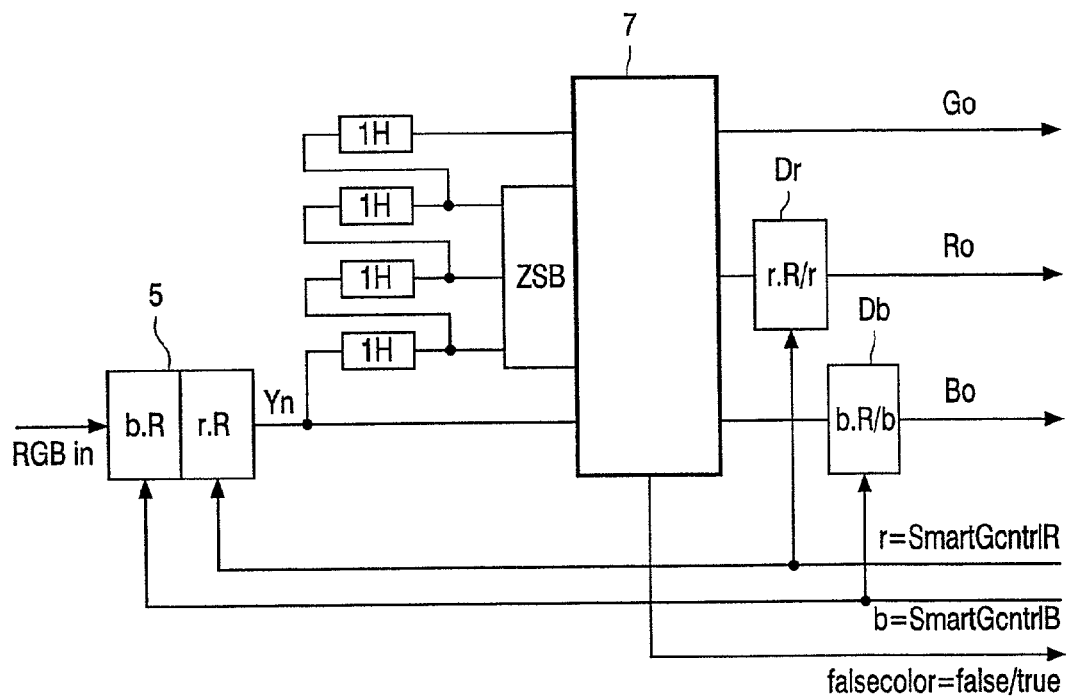
FIG. 9 shows a block diagram for parallel RGB reconstruction and contour filtering.

FIG. 9 shows the block diagram of the RGB reconstruction. Yn is the multiplexed RGB-signal of the sensor where R has been multiplied with Smartcntr1R, and B with Smartcntr1B, in a preprocessing block 5. This Yn-signal is used for the embodied smartgreen reconstruction. Via a zero switchbox ZSB, Yn is splitted into three colors, red=R*Smartcntr1R, green=G, and Blue=B*Smartcntr1B, making the conventional Laplacian RGB reconstruction possible with smart green in a 3×3 RGB reconstruction with/without smartgreen processing block 7. The so-called RBc signal in the median filter already fits R*SmartGcntr1R and B*SmartGcntr1B.

By dividing the reconstructed red and blue signals in dividers Dr and Db by SmartGcntr1R and SmartGcntr1B, respectively, the original red (Ro) and blue (Bo) sensor amplitudes are restored. This means that the usually applied matrix, white balance and gamma functions can be maintained. In digital circuit design multipliers are preferred to dividers. Therefore, in order to avoid the divider circuits, the best way is to let the computer of the camera calculate 1/Smartcntr1R and 1/Smartcntr1B. Next, via two separate wires, those values can be offered to two multipliers. The Ro-amplitude now becomes equal to the R-amplitude of the input signal (Smartcntr1R*R*(1/Smartcntr1R=R). The very same applies to the Bo-amplitude.

It should be noted that the parameters Smartcntr1R/B have been determined in a measurement cycle before the photograph is taken or in a continuous way in case of video mode.

The image sensor used for generating the array of pixels may form part of a digital camera. The pixels of the array may be arranged in perpendicular rows and columns; however, alternative arrangements may also be possible.

In order to obtain full color images with high color resolution, the sensor may be covered with a mosaic-like color pattern, where each pixel of the sensor is positioned behind a given color filter—e.g. a green filter. The RGB Bayer mosaic color filter would be a preferred choice in the present invention. However the method could also be used with a YeGCy Bayer sensor. Then the SmartGcntr1R/B parameters are calculated as where Ye−G=Red and Cy−G=Blue:

$$SmartGcntrlR = \frac{\Sigma Giwb}{\Sigma Riwb + \Sigma Giwb}$$

-continued $$SmartGcntrlB = \frac{\Sigma Giwb}{\Sigma Biwb + \Sigma Giwb}$$

Although the present invention has been described in connection with the preferred embodiment, it is not intended to be limited to the specific form set forth herein. On the contrary, it is intended to cover such alternatives, modifications, and equivalents, as can be reasonably included within the scope of the invention as defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of interpolating a missing color value of a pixel, said pixel forming part of an array of pixels generated by an image sensor having a color filter array, said array of pixels comprising a first and a second group of pixels, wherein the first group of pixels represents parts of an image optically filtered with a filter having a first color (G), and wherein the second group of pixels represents parts of the image optically filtered with one or more filters having one or more second colors (R, B), each pixel of the second group having a vertical and a horizontal neighboring pixel of the first group, said method comprising:
   providing individual first color informations of all neighboring vertical and horizontal pixels,
   selecting a pixel of the second group and providing second color information about the one or more second colors at the position of the selected pixel, and
   interpolating the missing color value at the position of the selected pixel using the individual first color informations and the second color information, said interpolating step comprising the step of calculating a median value of the individual first color informations and the second color information, wherein said interpolating step comprises:
   determining whether the selected pixel forms part of an edge in the image and whether said edge has an angle to a vertical line being substantially different from 90 degrees, said vertical line being defined by the neighboring vertical pixels to the selected pixel, and in case the edge has an angle to the vertical line being different from 90 degrees:
   determining a horizontal average value of the horizontal neighboring pixels,
   determining a vertical average value of the vertically neighboring pixel,
   calculating a median value using the determined horizontal average value, the determined vertical average value and the second color information at the position of the selected pixel, and
   in case the edge has an angle to the vertical line substantially equal to 90 degrees:
   calculating the median value of the individual first color informations and the second color information.

2. A method according to claim 1, where the step of determining whether the selected pixel forms part of an edge in the image and whether said edge has an angle to the vertical line substantially different from 90 degrees comprises:
   a) forming a first pair of diagonal pixels by selecting a vertical and a horizontal neighboring pixel and determining the difference between the color values of these pixels,
   b) forming a second pair of diagonal pixels by selecting a vertical and a horizontal neighboring pixel and determining the difference between the color values of these pixels, and
   c) determining the difference between color values of the pixels of the first and second pair of pixels.

3. A method according to claim 2, wherein each of steps a) and b) further comprises a step of determining if the determined differences are below a predefined level.

4. A method according to claim 3, wherein step c) further comprises a step of determining if the determined differences are below the predefined level.

5. A method according to claim 3, wherein the predefined level is between 5 and 7 percent of maximum color value.

6. A device for interpolating a missing color value of a pixel, said pixel forming part of an array of pixels generated by an image sensor having a color filter array, said array of pixels comprising a first and a second group of pixels, wherein the first group of pixels represents parts of an image optically filtered with a filter having a first color (G), and wherein the second group of pixels represents parts of the image optically filtered with one or more filters having one or more second colors (R, B), each pixel of the second group having a vertical and a horizontal neighboring pixel of the first group, said method comprising:
   means for providing individual first color informations about all neighboring vertical and horizontal pixels,
   means for selecting a pixel of the second group and providing information about the one or more second colors at the position of the selected pixel, and
   means for interpolating the missing color value at the position of the selected pixel using the individual first color informations and the second color information, said interpolating means comprising means for calculating a median value of the individual first color informations and the second color information, wherein said means for interpolating:
   determines whether the selected pixel forms part of an edge in the image and whether said edge has an angle to a vertical line being substantially different from 90 degrees, said vertical line being defined by the neighboring vertical pixels to the selected pixel, and in case the edge has an angle to the vertical line being different from 90 degrees:
   determines a horizontal average value of the horizontal neighboring pixels,
   determines a vertical average value of the vertically neighboring pixel,
   calculates a median value using the determined horizontal average value, the determined vertical average value and the second color information at the position of the selected pixel, and
   in case the edge has an angle to the vertical line substantially equal to 90 degrees:
   calculates the median value of the individual first color informations and the second color information.

* * * * *